(12) United States Patent
Clausen et al.

(10) Patent No.: US 10,417,618 B2
(45) Date of Patent: Sep. 17, 2019

(54) METHODS AND SYSTEM FOR UTILIZING CASH WITH ONLINE ACTIVITIES

(75) Inventors: Jason Clausen, Minneapolis, MN (US); Gordon Smith, Littleton, CO (US); Katie Hutcheson, Durango, CO (US); Joseph Anthony Parvis, Lakewood, CO (US); Paul Thomas, London (GB)

(73) Assignee: Moneygram International, Inc., Minneapolis, MN (US)

( * ) Notice: Subject to any disclaimer, the term of this patent is extended or adjusted under 35 U.S.C. 154(b) by 276 days.

(21) Appl. No.: 13/106,692

(22) Filed: May 12, 2011

(65) Prior Publication Data

US 2012/0290477 A1 Nov. 15, 2012

(51) Int. Cl.
 *G06Q 20/10* (2012.01)
 *G06Q 20/38* (2012.01)

(52) U.S. Cl.
 CPC ........... *G06Q 20/10* (2013.01); *G06Q 20/385* (2013.01)

(58) Field of Classification Search
 CPC .. G06Q 20/102; G06Q 20/382; G06Q 20/401; G06Q 30/0601; G06Q 20/10
 USPC ...................... 705/26.1, 40, 67, 39
 See application file for complete search history.

(56) References Cited

U.S. PATENT DOCUMENTS

| | | | |
|---|---|---|---|
| 6,736,314 B2 | 5/2004 | Cooper et al. | |
| 6,769,605 B1 * | 8/2004 | Magness | G06Q 20/10 235/379 |
| 7,104,440 B2 * | 9/2006 | Hansen | G06Q 20/00 235/379 |
| 7,182,252 B1 * | 2/2007 | Cooper | G06Q 20/02 235/375 |
| 7,229,011 B2 | 6/2007 | Hansen et al. | |
| 7,540,408 B2 * | 6/2009 | Levine | G06Q 20/04 235/379 |
| 7,549,575 B2 | 6/2009 | Hansen et al. | |
| 7,568,615 B2 * | 8/2009 | Corona | G06Q 20/10 235/379 |
| 7,587,342 B2 * | 9/2009 | Neofytides | G06Q 20/02 705/26.44 |
| 7,610,222 B2 | 10/2009 | Neofytides et al. | |

(Continued)

FOREIGN PATENT DOCUMENTS

KR 2007/0091248 A 9/2007

OTHER PUBLICATIONS

International Search Report and Written Opinion issued for PCT/US2012/029681, dated Jul. 5, 2012, 8 pages.

(Continued)

*Primary Examiner* — Sara C Hamilton
(74) *Attorney, Agent, or Firm* — Norton Rose Fulbright US LLP

(57) ABSTRACT

Systems and methods for facilitating cash payments for online transactions are provided. In some embodiments, a transaction is initiated online with a retailer where a user indicates that payment will be made for the transaction using cash. The user may then complete payment of the transaction with a cash payment service establishment using transaction identification information given to the user. Systems and methods for retrieving funds from an online/virtual account are also provided. In some embodiments, a user is able to initiate a funds transfer from an online/virtual account which are to be received in the form of cash at a money transfer service location.

11 Claims, 6 Drawing Sheets

(56) References Cited

U.S. PATENT DOCUMENTS

| | | | |
|---|---|---|---|
| 7,664,703 B2* | 2/2010 | Hansen | G06Q 20/00 705/43 |
| 7,856,384 B1* | 12/2010 | Kulasooriya | G06Q 20/04 705/35 |
| 7,878,393 B2* | 2/2011 | Henry | G06Q 20/042 235/379 |
| 7,912,786 B2* | 3/2011 | Battaglini | G06Q 20/10 705/35 |
| 7,930,216 B2 | 4/2011 | Neofytides et al. | |
| 7,937,292 B2* | 5/2011 | Baig | G06Q 20/02 705/26.1 |
| 7,941,342 B2 | 5/2011 | Baig et al. | |
| 7,941,346 B2 | 5/2011 | Baig et al. | |
| 7,949,600 B1* | 5/2011 | Portillo | G06Q 20/02 705/39 |
| 8,032,457 B2* | 10/2011 | Ostrovsky | G06Q 20/04 705/30 |
| 8,131,643 B2 | 3/2012 | Battaglini et al. | |
| 8,152,054 B2* | 4/2012 | Bulawa | G06Q 20/10 235/379 |
| 8,225,992 B2 | 7/2012 | Henry | |
| 8,275,699 B2 | 9/2012 | Shader et al. | |
| 8,321,347 B2 | 11/2012 | Battaglini et al. | |
| 8,336,768 B2 | 12/2012 | Bulawa et al. | |
| 8,387,868 B2 | 3/2013 | Henry | |
| 2003/0024979 A1 | 2/2003 | Hansen et al. | |
| 2004/0024701 A1* | 2/2004 | Hansen | G06Q 20/00 705/39 |
| 2005/0167481 A1 | 8/2005 | Hansen et al. | |
| 2006/0015437 A1 | 1/2006 | Kulasooriya et al. | |
| 2006/0015452 A1 | 1/2006 | Kulasooriya et al. | |
| 2006/0015453 A1 | 1/2006 | Kulasooriya et al. | |
| 2006/0131387 A1 | 6/2006 | Hansen et al. | |
| 2006/0253335 A1 | 11/2006 | Keena et al. | |
| 2007/0007332 A1 | 1/2007 | Hansen et al. | |
| 2007/0022049 A1 | 1/2007 | Diveley et al. | |
| 2007/0045395 A1 | 3/2007 | Corona et al. | |
| 2007/0061257 A1 | 3/2007 | Neofytides et al. | |
| 2007/0061258 A1 | 3/2007 | Neofytides et al. | |
| 2007/0187484 A1 | 8/2007 | Cooper et al. | |
| 2008/0035723 A1 | 2/2008 | Hansen et al. | |
| 2008/0052182 A1* | 2/2008 | Marshall | 705/26 |
| 2008/0086410 A1 | 4/2008 | Macguire | |
| 2008/0097905 A1 | 4/2008 | Neofytides et al. | |
| 2008/0140568 A1 | 6/2008 | Henry | |
| 2008/0222013 A1 | 9/2008 | Hansen et al. | |
| 2008/0288376 A1* | 11/2008 | Panthaki et al. | 705/30 |
| 2008/0288400 A1* | 11/2008 | Panthaki et al. | 705/40 |
| 2009/0070257 A1 | 3/2009 | Csoka | |
| 2009/0283585 A1 | 11/2009 | Hansen et al. | |
| 2010/0161485 A1 | 6/2010 | Bulawa et al. | |
| 2010/0191647 A1 | 7/2010 | Hansen et al. | |
| 2010/0205095 A1 | 8/2010 | Ostrovsky | |
| 2010/0223182 A1 | 9/2010 | Battaglini | |
| 2011/0029428 A1 | 2/2011 | Song et al. | |
| 2011/0087597 A1 | 4/2011 | Low et al. | |
| 2011/0125644 A1 | 5/2011 | Fleishman et al. | |
| 2011/0208550 A1* | 8/2011 | Lamarche et al. | 705/4 |
| 2011/0258122 A1* | 10/2011 | Shader et al. | 705/67 |
| 2012/0016766 A1* | 1/2012 | Raizada et al. | 705/26.25 |
| 2012/0078749 A1 | 3/2012 | Scipioni | |
| 2012/0078787 A1 | 3/2012 | Mehew et al. | |
| 2012/0084206 A1 | 4/2012 | Mehew et al. | |
| 2012/0233069 A1 | 9/2012 | Bulawa et al. | |
| 2013/0124350 A1 | 5/2013 | Bulawa et al. | |

OTHER PUBLICATIONS

"Cash payment comes to Internet retailing," by Internet Retailer. Published: Feb. 25, 2003. 2 pages.

"New player emerges in money transfers: Smart phones open way to alternative." Anonymous. Columbia Daily Tribune {Columbia, Mo] Dec. 1, 2010: B.5. Reprinted via Proquest on Nov. 5, 2013, 2 pages.

"New Western Union(R) PayCash(SM) Service Allows Internet Purhcases With Cash; A new Way to Cash-in' on the 'Net," PR Newswire [New York] Aug. 31, 2000: 1. Reprinted via Proquest on Nov. 5, 2013, 3 pages.

"The Name Isn't All That's New at the Former Kwedit," by Daniel Wolfe. American Banker [New York, NY] Sep. 27, 2010: 9. Reprinted via Proquest on Nov. 5, 2013. 3 pages.

The extended Search Report issued for European Patent Application No. 12782089.2, dated Nov. 11, 2014, 7 pages.

* cited by examiner

METHODS AND SYSTEM FOR UTILIZING CASH WITH ONLINE ACTIVITIES

TECHNICAL FIELD

The present application is related to cash transaction processing, and more specifically to utilizing cash within an online transaction environment.

BACKGROUND

In recent years, the number of retail transactions conducted online over the World Wide Web have accounted for a substantial amount of commerce. For example, in 2010 e-commerce retail sales have been estimated to total 165.4 billion dollars, up 14.8% from 2009. Further, the amount of commerce accounted for online is predicted to continue increasing in the future.

Many methods have been utilized to facilitate payment between a retailer and a customer in such transactions. Currently, online payment methods are account-based, such that the customer must hold some form of account and have a prior arrangement with a third party entity in order to facilitate payment. Credit, debit, prepaid gift card, and automated clearing house (ACH) payment techniques are examples of typical account-based systems. In these systems a customer generally provides account information to the online retailer, which then allows the retailer to obtain payment from a third party entity associated with the customer's account.

Other common account-based services are embodied as online account services such as PayPal™. With a PayPal™ account, a user typically deposits funds in an account using another account, or can obtain funds in the online account as a result of payments from other PayPal™ users. When a transaction is undertaken with a retailer which utilizes a PayPal™ account for payment, funds are transferred from a PayPal™ account in a similar manner as how a credit, debit, or ACH payment transaction is undertaken.

Unfortunately, the present account-based systems are deficient with respect to a substantial number of internet users. Many of these users may not have access to the requisite accounts necessary to complete such transactions. For example, these users may be under-banked in that they do not have or are unable to obtain a bank account. Additionally, many individuals are not able to have access to credit cards. In such circumstances, these users may be required to utilize cash for every day purchases. Further, it is noted that some users may simply prefer to utilize only cash for such purchases regardless of the fact that they have access to such accounts.

Under-banked users may also have problems receiving online payments with respect to web activity. For example, in the event that a user has sold an item online or is owed money from another online service, without a bank account it is difficult for a user to receive funds. Some services allow for checks to be directed to a user. However, in the circumstance that a user does not have a bank account, a check may not be an ideal form of payment and cash would be preferable. Further, some users may require payment in a foreign country where their regular banking is inaccessible. It could also be preferable for these users to be able to obtain a cash payment in the currency of the foreign country.

BRIEF SUMMARY

The present application relates to systems and methods for facilitating cash payments and withdrawals for online transactions. In some embodiments, a transaction is initiated online with a retailer where a user indicates that payment will be made for the transaction using cash. The user may then complete payment of the transaction with a cash payment service establishment using transaction identification information given to the user. In some embodiments, a transaction is initiated by a user for retrieving funds from an online/virtual account. For example, in one embodiment a user is able to initiate a funds transfer from an online/virtual account which are to be received in the form of cash at a money transfer service location.

An example embodiment may be characterized as a method which includes receiving a transaction code from a customer, the online transaction code generated by an online retail establishment. The method also includes verifying transaction details associated with the transaction code to determine whether the transaction is valid. Additionally, the method includes accepting a cash payment from the customer at a cash payment service location, where the cash payment corresponds to a transaction indicated by the transaction code. Further, the method includes notifying the online retail establishment that payment for the indicated transaction has been received.

In accordance with one example embodiment, a method of facilitating a cash payment for an online transaction is provided. The method includes receiving a transaction code from a customer where the transaction code is generated as a result of an online purchase from an online retail establishment, and where the online transaction code is generated by the retail establishment. Additionally, the method includes communicating with a retail server to verify that the transaction code corresponds to a valid transaction and receiving confirmation from the retail server that the online purchase corresponding to the transaction code is valid. The method further includes accepting a cash payment from the customer at a cash payment service location, where the cash payment corresponds to a transaction indicated by the transaction code. After the cash is accepted, the method includes transmitting an acknowledgement from a local agent device at said cash payment service location to said retail server that payment for the online purchase has been received, thereby allowing said online retail establishment to fulfill the remainder of the indicated transaction.

In accordance with another example embodiment, a method may include receiving a transaction identifier corresponding to an online transaction where the transaction identifier includes information about an originating entity corresponding to the transaction. The method further includes communicating with a transaction server of the originating entity corresponding to said transaction in order to verify whether the transaction identifier is valid. The method also includes completing the transaction utilizing a local agent of a money transfer service location, and communicating with the transaction server of the originating entity corresponding to the transaction to inform the originating entity that the transaction has been completed.

Another example embodiment may be characterized as a method for retrieving money from an online account. The method includes receiving transaction information by a cash money transfer service, where the transaction information originates from an online financial account service provider. The method also includes acknowledging receipt of the transaction information by said cash money transfer service, and receiving funds associated with the transaction information by the cash money transfer service. Upon receiving the funds, the method includes the steps of identifying a recipient associated with the transaction information and distributing the funds to the identified recipient at an agent location of said cash money transfer service.

One embodiment may be characterized as a system for facilitating an online cash transaction. The system may include a transaction payment processing system that comprises a plurality of processing devices distributed across a plurality of network locations, where the processing devices are configured to receive transaction identification information corresponding to an online transaction. The system may further include a transmission device associated with one or more of the network locations. The transmission device may be configured to transmit an authentication message in order to authenticate received transaction identification information. Further, the transmission device may be configured to transmit payment authentication information to the online service in order to authenticate whether a cash payment has been distributed/received at one of said plurality of network locations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
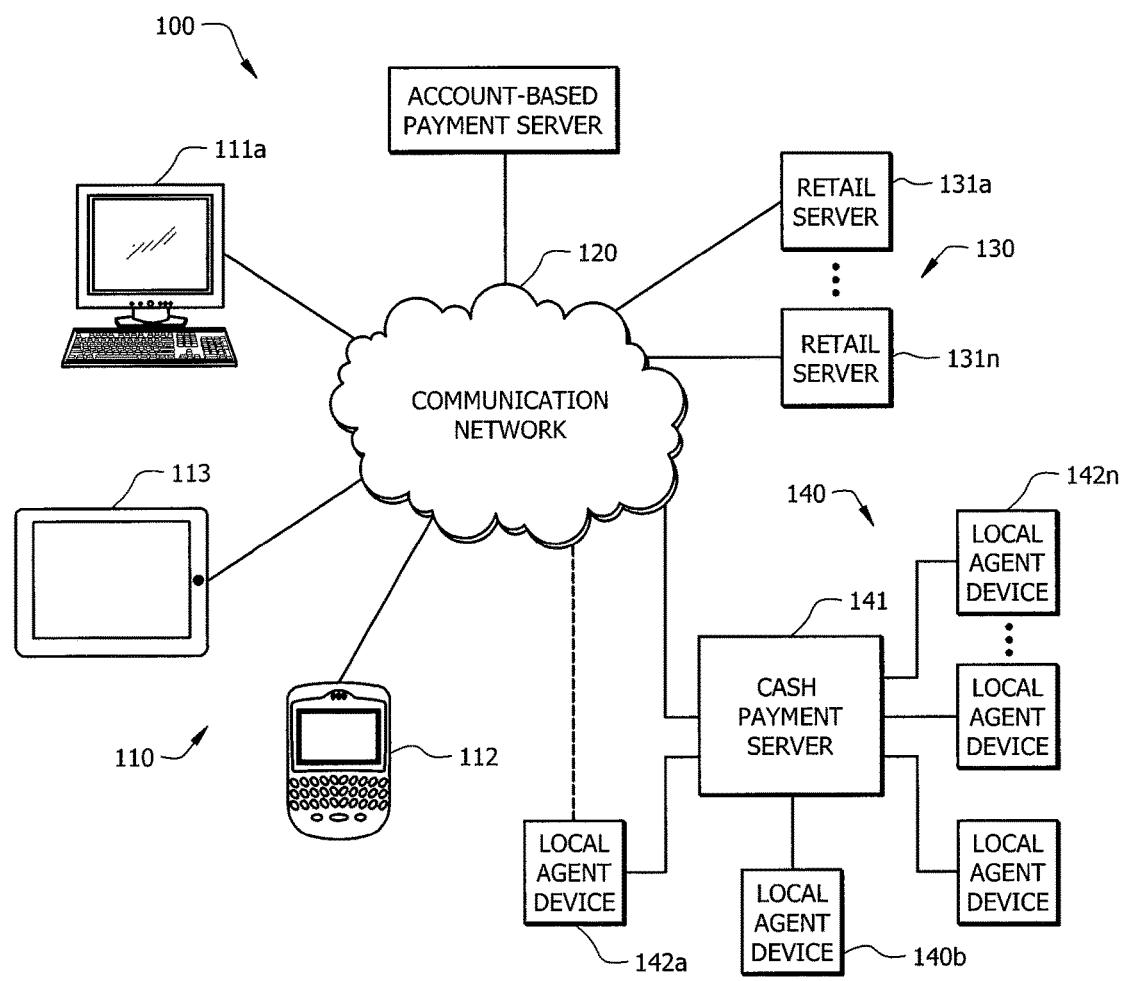
FIG. 1 shows a system for utilizing cash payment for online transactions in accordance with embodiments of the invention.

FIG. 1 illustrates a system 100 for utilizing cash with online transactions in accordance with an embodiment of the present application. In the illustrated embodiment, system 100 includes a plurality of user devices 110. User devices 110 may communicate with communication network 120 via user devices such as a computer 111, mobile device 112, tablet device 113, and the like. User devices 110 may be implemented as any device which is configured to facilitate an online transaction between a user and one or more of a plurality of retailers 130.

Communication network 120 may be a packet-switched network such as the World Wide Web, a cellular/3G/4G network, or any other network configured to facilitate communications between the various devices of FIG. 1. Additionally, communication network 120 may be combination of networks working in conjunction to allow for the communications described for the embodiments herein.

Communication network 120 is communicatively coupled to retailer servers 131a-n. Retailer servers 131a-n may correspond to one of a plurality of online retail services which offer goods or services to a customer communicating via a user device 110. Examples of such retailers included but are not limited to online retail store sites such as Amazon.com™, Buy.com™, Wal-Mart.com™, Staples.com™, and the like. Further, online retailers may include service-based businesses that provide services such as legal services, advising services, and the like. Embodiments are not limited by the type of service or good being offered by retailers 130.

Communication network 120 is also in communication with cash payment network 140. Cash payment network 140 may include a central cash payment server 141 in communication with a plurality of local agent devices 142a-n. Alternatively, local agent devices 142a-n may be in direct communication with communication network 120.

System 100 may also include an account-based payment server 150 corresponding to various third-party account-based payment services. The interconnection and abilities of system 100 may be used in accordance with multiple inventive methods of the present application, as will be exemplified below.

Figure 2:
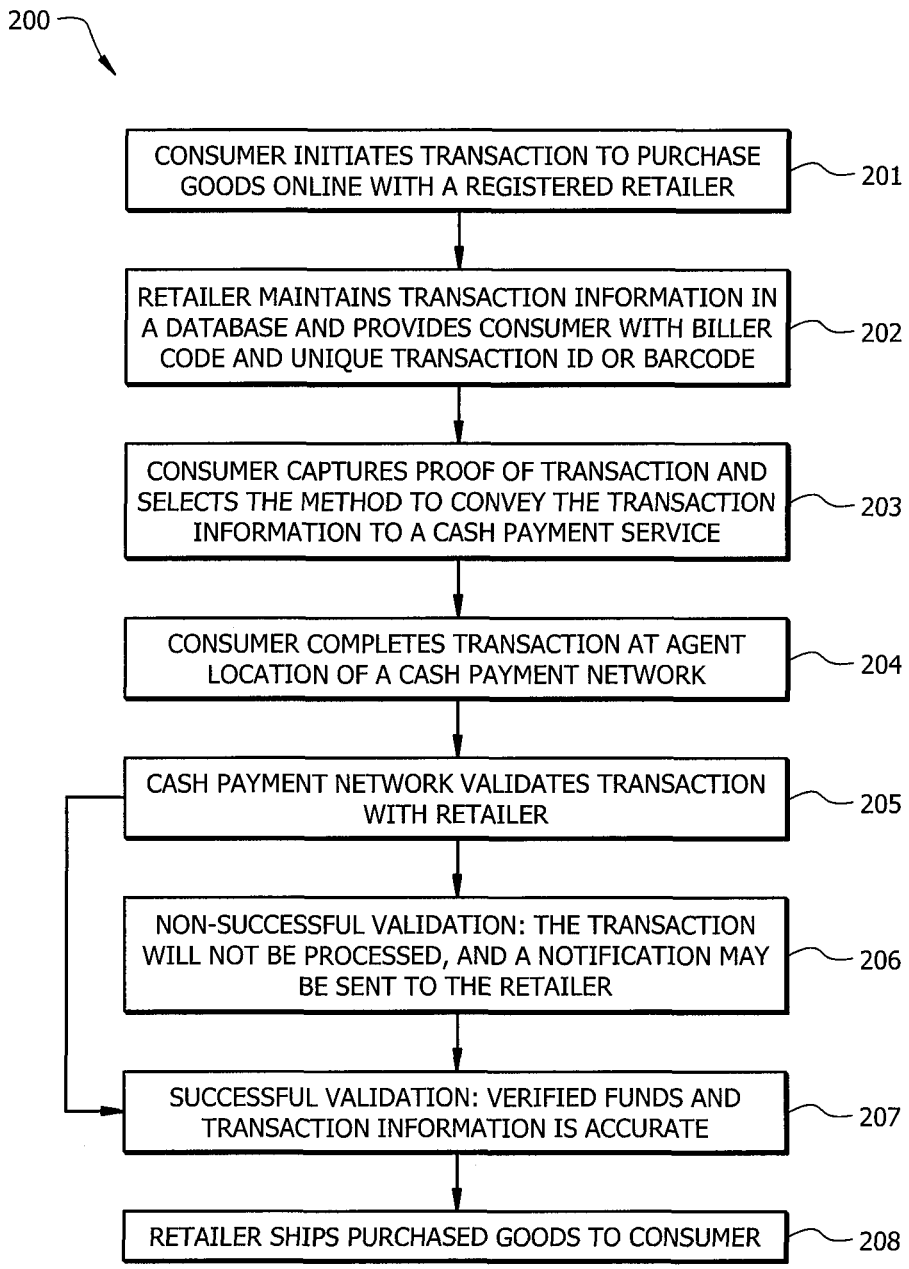
FIG. 2 is a flowchart of an example online cash transaction method in accordance with an embodiment of the invention.

FIG. 2 illustrates a flowchart of an example online cash transaction method 200 in accordance with an embodiment of the present application. In step 201, a user initiates a transaction to purchase goods or services with a retailer. This initiation may be completed on a system such as system 100 whereby a user utilizes one or more of user devices 110 to communicate with a retailer 130. As shown in step 202, the retailer maintains transaction information in a database, such as on retail server 131, and provides a consumer with a proof of transaction in a form such as a biller code, unique transaction ID, barcode, and the like.

Transaction information maintained by the retailer may generally include information regarding the type and amount of goods or services purchased, customer information, shipping information, etc. However, it is not necessary that all of such information is provided within the proof of transaction that is provided to the customer. For example, a proof of transaction may include information such as the amount of payment due to the retailer, and an identification of the retailer of which to direct the payment. In some embodiments, it may be preferable to pre-register a retailer with a cash payment service. When such a pre-registration occurs, the transaction information provided to the consumer may include an identifier corresponding to the pre-registered retailer.

With the proof of transaction, at step 203 a user may select the method to convey the transaction information to a cash payment service. For example, the selected methods may include conveying the transaction information by printing the transaction information using a user device 110, saving it to be viewable on a computing device 111, 112 or mobile device 113, or forwarding it over communication network 120 to a cash payment network 140 via email, Short Message Service (SMS) message, and the like.

In one embodiment, a proof of transaction may take the form of barcode which is either printed by a user or displayed in a scannable form on a user device. In this embodiment, a customer may enter the location of a local agent where the barcode may be scanned and used to provide the transaction information to a local agent device, such as device 142. In another embodiment, a proof of transaction may include a transaction number which is coded such that when it is received by a local agent and is inputted into local agent device 142, the details and requirements of the transaction will be sufficiently known by the cash payment service in order to complete the transaction.

It is noted that any means to convey the transaction information and to provide a cash payment service with sufficient information to complete the transaction may be used in accordance with inventive aspects of the present application. In some embodiments, the point in time when a customer presents the proof of transaction to a cash payment service may be the first time that the cash payment service obtains knowledge of the transaction (e.g., subsequent transaction details have been arranged without the knowledge or participation of the cash payment service). Conversely, in some embodiments, the cash payment service may be sent the transaction information from the retailer upon receiving an indication from the customer that the transaction payment will be completed in this manner. In such embodiments, it is also possible to find transaction details in the event that a user is unable to locate the requisite transaction information that would normally be utilized in completing the transaction.

At step 204, a user may complete the transaction at an agent location within cash payment network, such as network 140. As indicated above, the user will provide the proof of transaction and corresponding transaction information which is inputted into a local agent device 142. A local agent may be part of a money transfer service network such as the MoneyGram® network. A user may enter a location of such a money transfer service and speak to an in-person agent, use an automated teller machine (ATM), etc., to complete the transaction.

In one embodiment, the agent will then validate that the transaction information provided by the user is still valid, e.g., that the transaction has not been canceled, that a time lapse requirement has not been surpassed, etc. The transaction is completed at step 207 upon successful verification that the transaction information is accurate and sufficient funds to complete the transaction have been received. Upon successful completion, the retailer may ship purchased goods to the user at step 208, or otherwise provide the agreed-upon goods and services.

In the event that the transaction is not validated, the transaction will not be processed and notification may be sent to the retailer at step 206. Reasons why a transaction may not be valid may occur when, for example, after a pre-specified time period has elapsed, if a retailer or customer has voided the transaction, etc.

Once the transaction is completed and the requisite payment has been made, the cash payment network may notify the appropriate retail establishment at step 205 that the transaction is complete. In some embodiments, this may be done by having local agent device 142 communicate with cash payment server 141, which in turn communicates with the appropriate retail server 131. Alternatively, the cash payment server 141 may also automatically trigger a message to be sent to the retail establishment to notify the retailer that the transaction has been completed. The message may be sent via email, SMS, or other messaging platforms. Alternatively, local agent device 142 may communicate directly across communication network 120 to the appropriate retail server 131. It is noted that notification may occur at the time of receipt of funds, or as part of a batch of transactions at appointed times. Moreover, the local agent may wait to accept funds until after the validation of a transaction, in whole or in part, has taken place.

Figure 3:
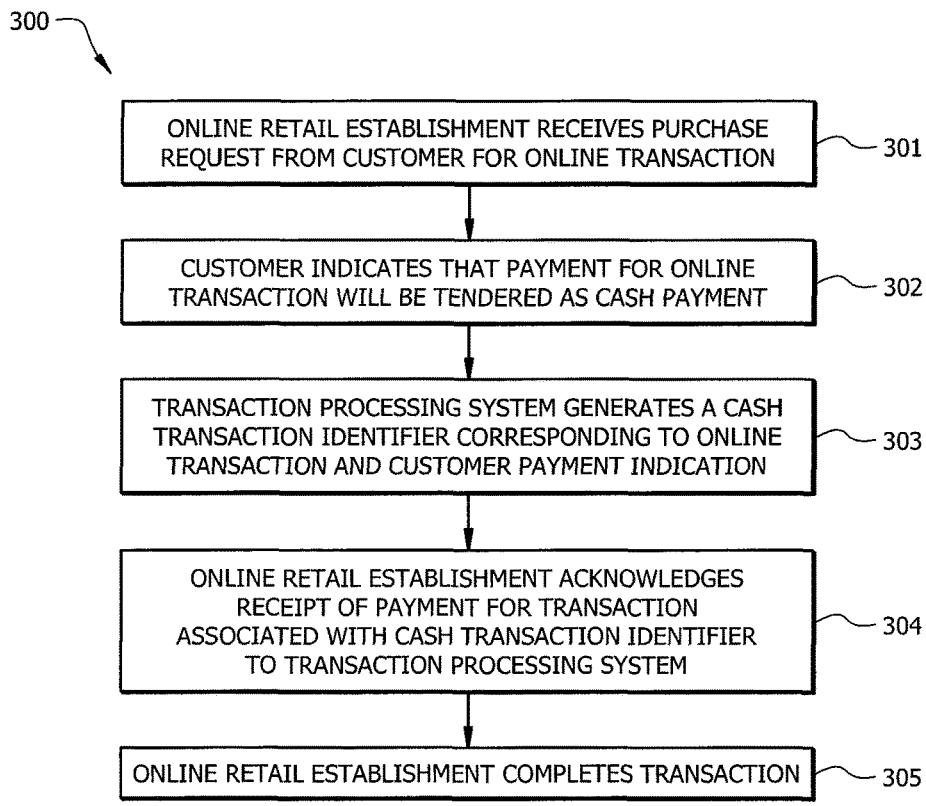
FIG. 3 is a flowchart corresponding to a method of completing payment for an online transaction in accordance with an embodiment of the invention.

FIG. 3 illustrates a flowchart corresponding to a method 300 of completing payment for an online transaction in accordance with one embodiment of the present application. The method 300 includes receiving a transaction purchase request from a customer for the online transaction at step 301. At step 302, an indication is received from the customer that payment for said online transaction will be tendered as a cash payment. Once the indication is received, a cash transaction identifier is generated by a transaction processing system in response to details corresponding to the online transaction and the indication from the customer at step 303. At step 304, an authentication acknowledgment is received which signifies that a cash payment has been received for the transaction associated with the cash transaction identifier. The online transaction may then be completed upon receipt of said authentication acknowledgment at step 305.

Figure 4:
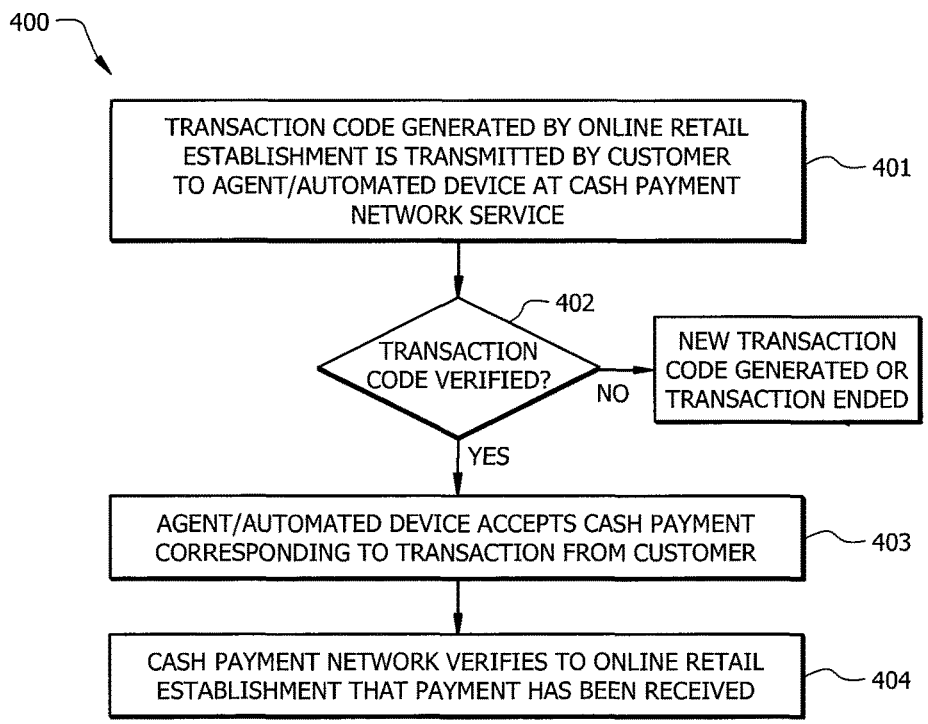
FIG. 4 is a flowchart corresponding to a method for facilitating a cash payment for an online transaction in accordance with an embodiment of the invention.

FIG. 4 illustrates a flowchart corresponding to another method 400 for facilitating a cash payment for an online transaction in accordance with one embodiment of the present application. In this embodiment an online transaction code which is generated by an online retail establishment is received from a customer at step 401. Verification of transaction details associated with the transaction code to determine whether the transaction is valid is undertaken at step 402. Such verification may be effectuated by communicating with a retail server, such as server 131. Cash payment for a transaction corresponding to the transaction indicated by the transaction code is then accepted at a cash payment service location at step 403. Verification to the online retail establishment that payment for the indicated transaction has been received is then provided at step 404. In one embodiment, this verification is implemented by transmitting an acknowledgement from a local agent device, such as local agent device 142, at the cash payment service location to a retail server, such as server 131, that payment for the online purchase has been received. With such a verification the online retail establishment to is notified that it is able fulfill the remainder of the indicated transaction.

Additionally, it is noted that embodiments described above contemplate a direct cash payment for the entire amount of the transaction. However, cash payment methods in accordance with some embodiments of the present application may be utilized in combination with account-based methods. Further, in one embodiment, payment may be tendered using a virtual gift card which is paid for via a cash payment service network. In this embodiment a user may select an option to purchase a virtual gift card to pay for a transaction. Upon selecting the virtual gift card option, the user may go to a cash payment service provider to pay for the gift card and then use the gift card as cash on the retail website.

Figure 5:
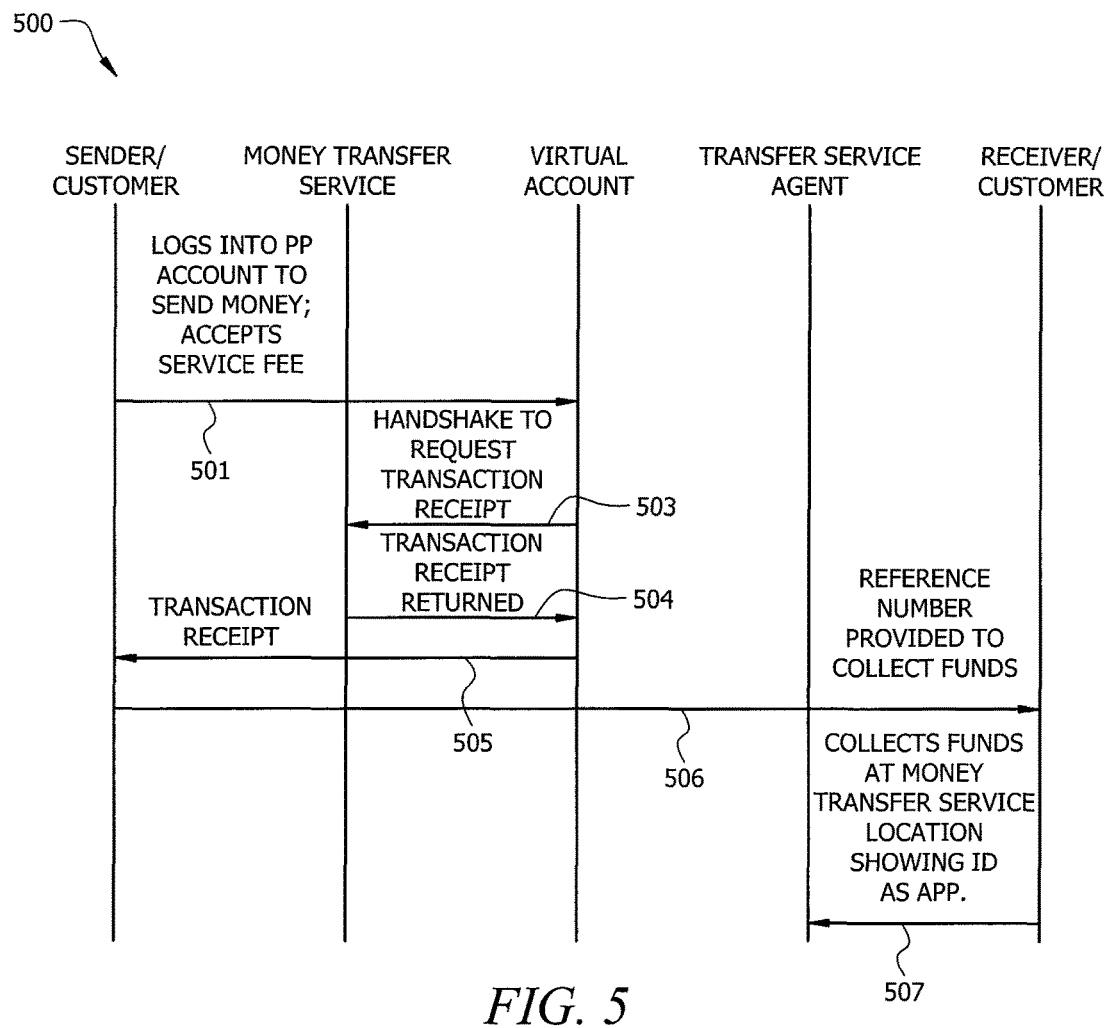
FIG. 5 is a communication flow diagram of a method for withdrawing funds from an online account in accordance with an embodiment of the invention.

FIG. 5 illustrates a communication flow diagram 500 of a method for withdrawing funds from an online account in accordance with an embodiment of the present application. In this example embodiment, a customer has funds in an electronic account such as a bank account, a prepaid card, store value, Mobile Wallet™, PayPal™, and the like. This method provides a means for this customer to receive cash funds without the need of transferring said funds to another account based system, or without need of cashing a received check. Further, this method provides a means to where a customer may receive funds to a virtual account which may be in the form of various currencies, and then cash out the funds in a desired currency.

The communication flow 500 begins with a customer initiating a cash out transaction with a electronic/virtual account at step 501. In this step, a request is received from the customer to withdraw funds from the online account, and the customer indicates that the withdrawal is to be completed by a cash money transfer service. It is noted that as with the embodiments discussed above, a communication system, such as all or part of system 100, may be used to facilitate various embodiments. For example, the virtual account may be managed by account-based payment server 150 and a customer may utilize a user device 110 to communicate with account-based payment server 150 over communication network 120. Access to the virtual account and customer transfer requests may be implemented using software executed within a website, an online Application Programming Interface (API), mobile device applications, and the like.

It is noted that in some embodiments, such as described with respect to FIG. 5, the funds transfer is initiated from the electronic account service end. In yet another embodiment, a funds transfer may be initiated via the money transfer service end using a website, an API, mobile device applications and the like. In such embodiments, electronic/virtual accounts may be registered within the money transfer service network, thereby allowing the money transfer service to initiate contact with the electronic/virtual account service.

After receiving the transaction request, the virtual account service communicates transaction information with a money transfer service at step 502. The money transfer service may then acknowledge that the transaction information has been received and/or may verify that the transaction terms are acceptable at step 504. This communication may be facilitated between, for example, account-based payment server 150 and cash payment server 141.

The customer may be given an acknowledgement that the transaction has been established at step 505. In some embodiments, the sender and receiver may be the same person, while in others they may be different people. In embodiments where they are different individuals it may be beneficial to provide a reference number for the transaction to the receiver in order to help identify the receiver to collect funds at step 505.

To receive the transferred funds, the customer/receiver may arrive at a money transfer service agent location and provide the agent with proper identification at step 507. Upon receiving proper identification, cash funds may be distributed by the agent.

Figure 6:
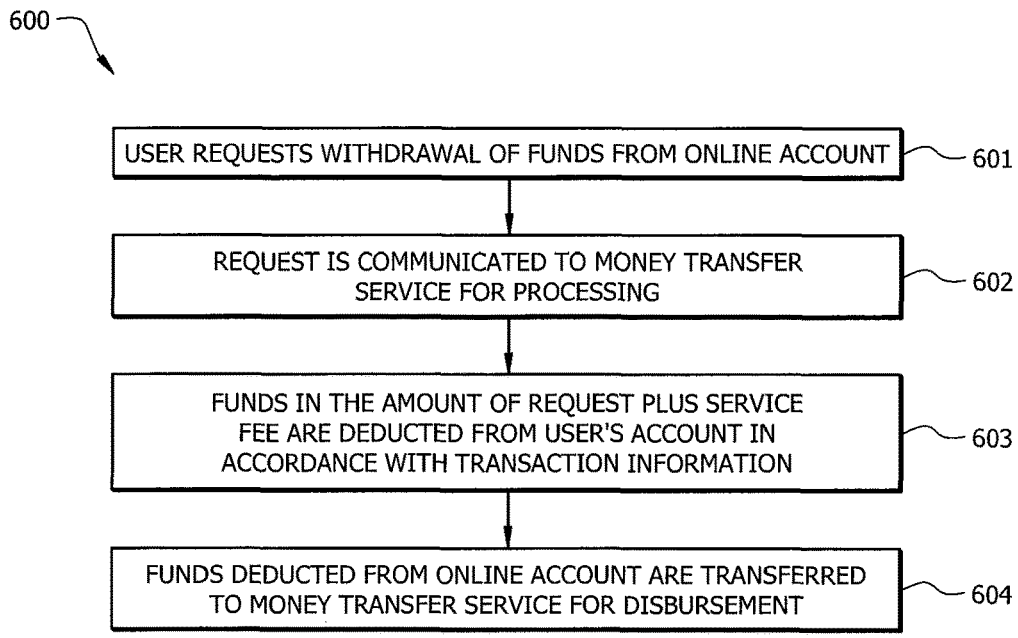
FIG. 6 is a flowchart corresponding to a method for transferring funds from an online account in accordance with an embodiment of the invention.

FIG. 6 illustrates a flowchart corresponding to a method 600 for transferring funds from an online account. The method includes, at step 601, receiving a request from a user to withdraw funds from the online account, where the funds withdrawal is to be completed by a cash money transfer service. The method further includes, at step 602, communicating transaction information to the money transfer service. Additionally, at step 603, funds are deducted from the user's account in accordance with the transaction information, where the deducted funds include an amount requested by the user and a service fee for said cash money transfer service. Further, at step 604 the deducted funds are transferred to the cash money transfer service.

Figure 7:
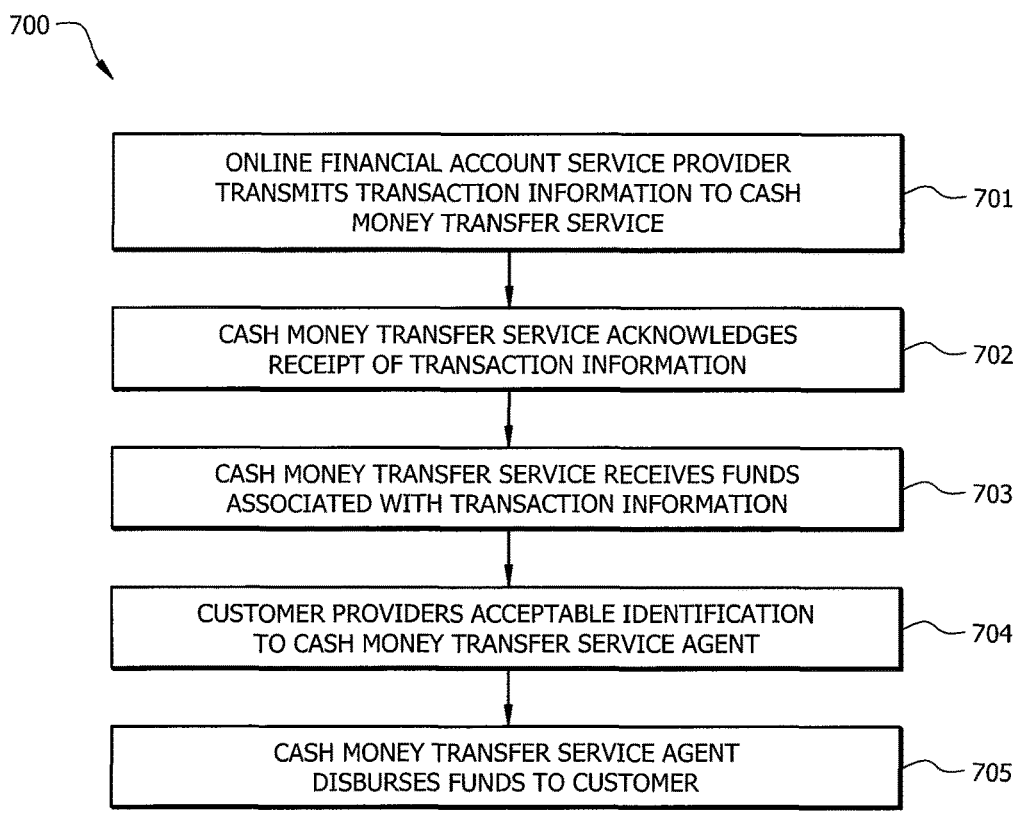
FIG. 7 is a flowchart corresponding to a method for retrieving money from an online account in accordance with an embodiment of the invention.

FIG. 7 illustrates a flowchart corresponding to a method 700 for retrieving money from an online account. The method includes, at step 701, receiving transaction information by a cash money transfer service, where the transaction information originates from an online financial account service provider. The method further includes, at step 702, acknowledging receipt of the transaction information by the cash money transfer service. Additionally, at step 703 funds are received by the cash money transfer service which are associated with the transaction information. When the recipient arrives to obtain the funds, the recipient associated with the transaction information is identified at step 704. Upon proper identification, the funds are distributed to identified recipient at an agent location of the cash money transfer service at step 705.

Figure 8:
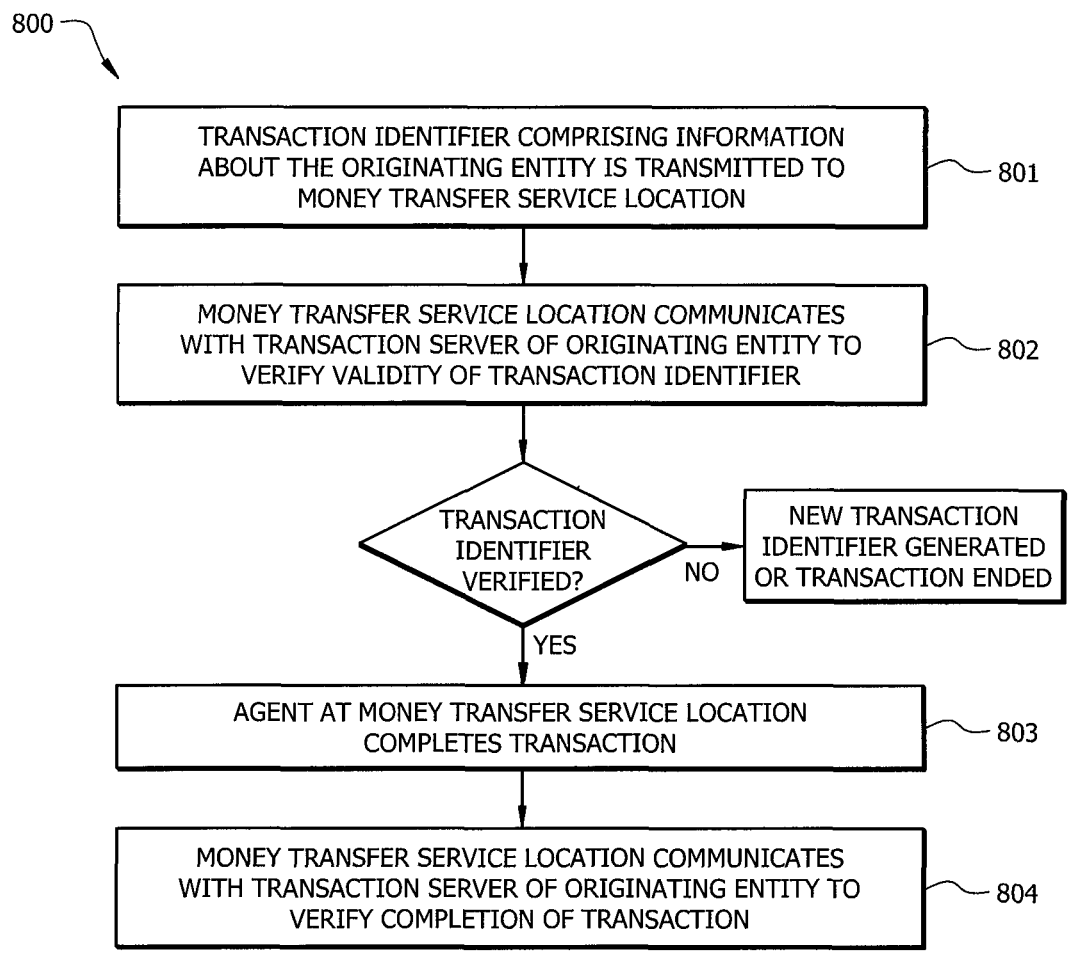
FIG. 8 is a flowchart corresponding to a method for facilitating an online cash transaction in accordance with an embodiment of the invention.

FIG. 8 illustrates a flowchart corresponding to a method which more generally presents an embodiment that may be characterized as a method 800 for facilitating an online cash transaction. The method includes, at step 801, receiving a transaction identifier corresponding to an online transaction where transaction identifier comprises information about an originating entity corresponding to the transaction. Communications with a transaction server of the originating entity corresponding to said transaction are undertaken to verify whether the transaction identifier is valid at 802. The method further includes, at step 803, completing the transaction with a local agent of a money transfer service location. When the transaction is completed, the method includes communicating with the transaction server of said originating entity corresponding to the transaction that the transaction has been completed at step 804.

It is noted that the embodiments illustrated in FIGS. 3-8 may be implemented within a communication system, such as the system described with respect to FIG. 1, and may also be implemented using details set forth with respect to the transaction flow described with respect to FIG. 2. Further, in some embodiments, aspects of the embodiments described in FIGS. 2-8 may be combined in order to facilitate transactions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for facilitating use of cash for online transactions, the method comprising:
   receiving, by a cash payment network device operating within in a cash payment network and at a cash payment service location, input corresponding to a transaction code comprising a transaction number coded to provide transaction details to said cash payment network device without communicating with an online retail establishment, wherein said transaction code is generated by the online retail establishment for an online transaction initiated by a customer, and wherein said transaction details comprise at least an amount of payment for said online transaction and information identifying said online retail establishment;
   obtaining, by said cash payment network device operating within the cash payment network and at the cash payment service location, the transaction details comprising at least said amount of payment and said information identifying said online retail establishment from said transaction code, and wherein knowledge of said transaction details associated with said online transaction is first obtained from said transaction code;
   determining, by said cash payment network device at the cash payment service location and operating within the cash payment network, whether the transaction details obtained from said transaction code are valid, based at least in part on communications with a retail server of the online retail establishment via a communication network, wherein determining whether the transaction details obtained from said transaction code are valid includes determining whether the online transaction has been canceled;
   in response to determining that the online transaction has been canceled, determining that the online transaction is not valid, ending the online transaction, and notifying, by the cash payment network device via the communication network, said online retail establishment that the online transaction was not validated;
   at least partly in response to determining that the online transaction has not been canceled, determining that the online transaction is valid, accepting from said customer at said cash payment location, cash payment for said online transaction, and notifying, by the cash payment network device via the cash payment network, a cash payment server that payment for the online transaction has been received, wherein the cash payment server notifies the retail server of the online retail establishment that payment for the online transaction has been received via the communication network;
   storing, by the cash payment network device, a record associated with the cash payment for the online transaction in a database; and
   providing an amount of funds corresponding to the payment for the online transaction to the online retail establishment, wherein the amount of funds is provided to the online retail establishment via one of a money transfer transaction in which a representative of the online retail establishment receives the amount of funds by visiting a particular cash payment service location and an electronic funds transfer initiated via an electronic account service.

2. The method of claim 1 wherein the input corresponding to said transaction code is derived from a printout from said customer.

3. The method of claim 1 wherein said transaction code provides information with respect to said online retail establishment and a transaction amount.

4. The method of claim 1 wherein said input corresponding to said transaction code is generated based on a bar code provided by the customer.

5. The method of claim 1 wherein said cash payment service location is an agent location at a physical establishment.

6. The method of claim 1 wherein the step of determining, by said cash payment network device at the cash payment service location, whether the transaction details associated with said online transaction is valid comprises accessing a remote database administered by said online retail establishment.

7. A cash payment network system facilitating use of cash to pay for online transactions, the cash payment network system comprising:
   a cash payment network device operating within a cash payment network and at a cash payment service location comprising:
   a processor; and
   a memory communicatively coupled to the processor, wherein the processor is configured to:
     receive input corresponding to a transaction code comprising a transaction number coded to provide transaction details to said cash payment network device without communicating with an online retail establishment wherein said transaction code is generated by the online retail establishment for an online transaction initiated by a customer, and wherein said transaction details of said online transaction comprise at least an amount of payment for said online transaction and information identifying said online retail establishment;
     obtain the transaction details comprising at least said amount of payment and said information identifying said online retail establishment, and wherein knowledge of said transaction details associated with said online transaction is first obtained from said transaction code;
     determine whether said transaction details obtained from said transaction code are valid based at least in part on communications with a retail server of said online retail establishment via a communication network, wherein determining whether the transaction details obtained from said transaction code are valid includes the processor being further configured to determine whether the online transaction has been canceled;
     in response to determining that the online transaction has been canceled:
       determine said online transaction is not valid;
       end said online transaction; and
       notify said online retail establishment that said online transaction was not validated via the communication network; and
     at least partly in response to determining that said online transaction has not been canceled:
       determine said online transaction is valid;

accept, from said customer at said cash payment location, cash payment for said online transaction;

notify, via the cash payment network, a cash payment server that payment for the online transaction has been received, wherein the cash payment server notifies the retail server of the online retail establishment that payment for the online transaction has been received via the communication network; and store a record associated with said cash payment for said online transaction in a database; and provide an amount of funds corresponding to the payment for the online transaction to the online retail establishment, wherein the amount of funds is provided to the online retail establishment via one of: a money transfer transaction in which a representative of the online retail establishment receives the amount of funds by visiting a particular cash payment service location, and an electronic funds transfer initiated via an electronic account service.

8. The cash payment network system of claim 7, wherein said transaction code is received as said input from a printout provided by said customer.

9. The cash payment network system of claim 7, wherein said transaction code is generated based on a bar code provided by the customer.

10. The cash payment network system of claim 7, wherein said cash payment network device is located at a physical establishment corresponding to an agent location.

11. The cash payment network system of claim 7, wherein determining whether the transaction details obtained from said transaction code are valid includes the processor being configured to access a remote database administered by said online retail establishment.

\* \* \* \* \*